June 27, 1944.   A. S. EASH   2,352,373
POULTRY DRINKING FOUNTAIN
Filed March 23, 1943   2 Sheets-Sheet 2
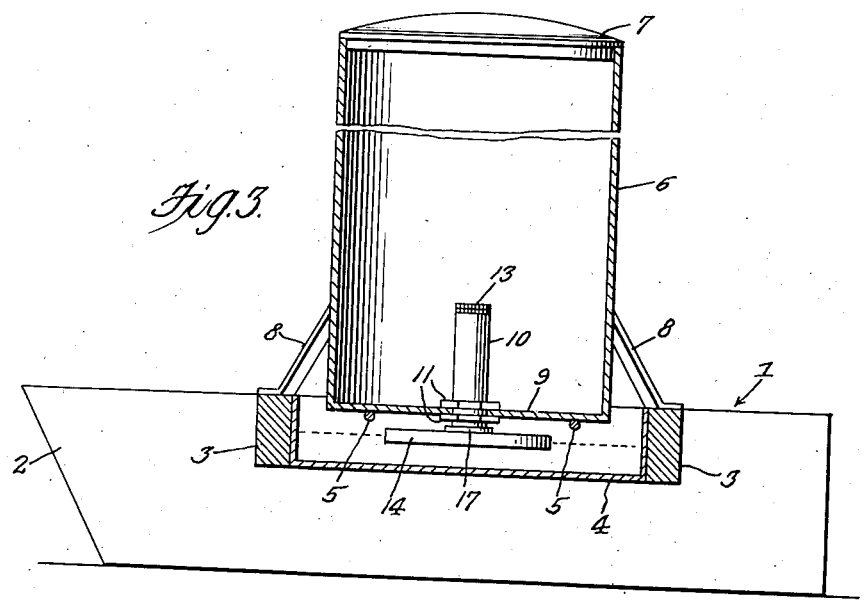
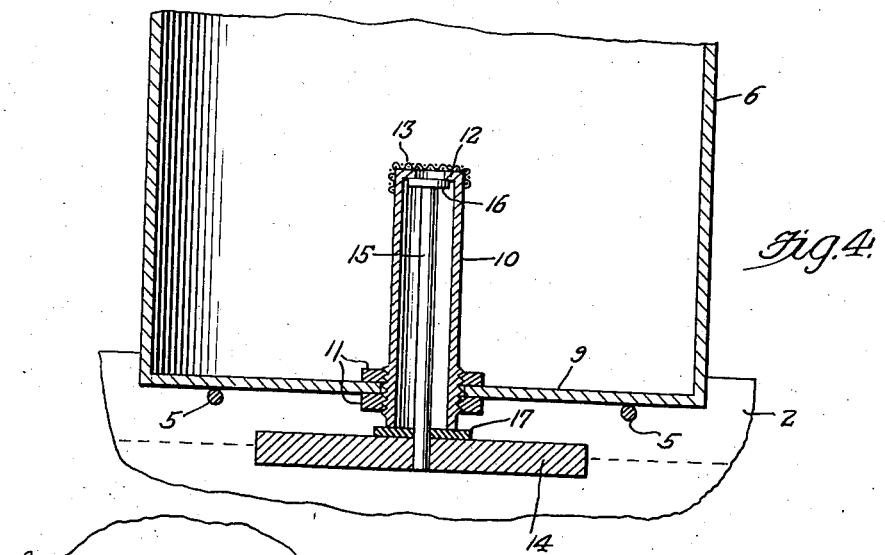
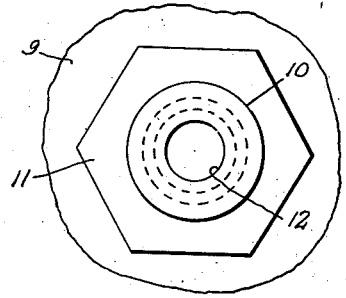
Inventor
Andrew S. Eash
By Clarence A. O'Brien
and Harvey B. Jacobson
Attorneys

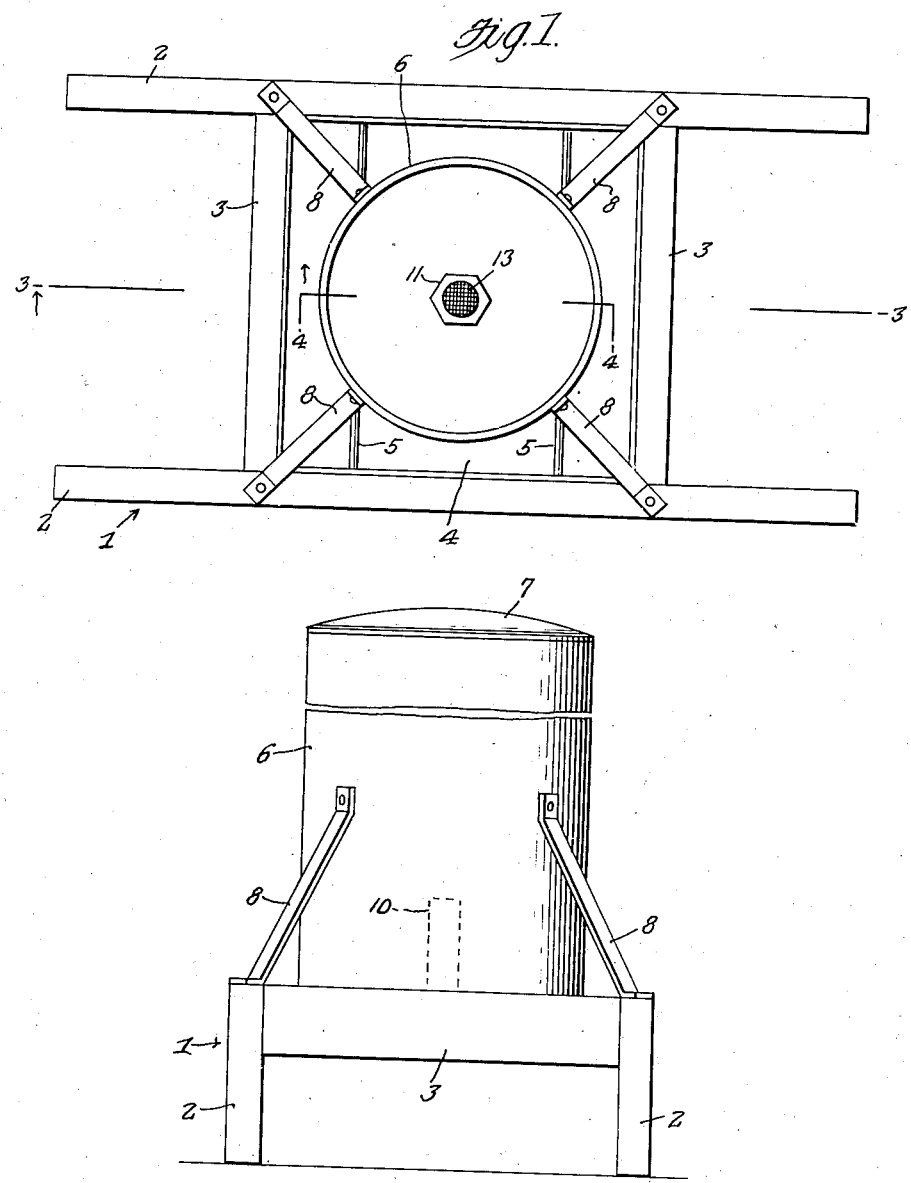

UNITED STATES PATENT OFFICE 2,352,373

POULTRY DRINKING FOUNTAIN

Andrew S. Eash, Wellman, Iowa

Application March 23, 1943, Serial No. 480,206

1 Claim. (Cl. 119—80)

The present invention relates to new and useful improvements in drinking fountains, particularly for turkeys and chickens, and has for one of its important objects to provide, in a manner as hereinafter set forth, a device of this character which is adapted to be conveniently moved from place to place.

Another very important object of the invention is to provide a movable drinking fountain of the aforementioned character comprising unique means for automatically maintaining the water which is available to the fowls at a constant level.

Other objects of the invention are to provide an automatic, movable poultry fountain of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a drinking fountain constructed in accordance with the present invention.

Figure 2 is a view in end elevation of the device.

Figure 3 is a view in vertical longitudinal section through the device, taken substantially on the line 3—3 of Figure 1.

Figure 4 is a fragmentary view in vertical section through the lower portion of the tank and valve, taken substantially on the line 4—4 of Figure 1.

Figure 5 is a top plan view of the outlet nipple.

Referring now to the drawings in detail, it will be seen that the embodiment of the invention which has been illustrated comprises an elongated movable base which is designated generally by reference numeral 1. The base 1 is in the form of a sled comprising runners 2 between intermediate portions of which spaced cross members 3 extend.

Mounted on the base 1, within the confines of the members 2 and 3, is a metallic pan 4. It will be observed that the bottom of the pan 4 is elevated in respect to the ground. Metallic rods 5 traverse the pan 4 below the top thereof, said rods being mounted on the members 2 of the base 1.

The rods 5 support a reservoir 6 in the upper portion of the pan 4, said reservoir being for the reception of water. The reservoir 6 is provided with a removable cover 7. Braces 8 are provided for the reservoir 6.

Mounted centrally in an opening which is provided therefor in the bottom 9 of the reservoir 6 is a vertical discharge pipe or nipple 10. Nuts 11 which are threaded on the pipe 10 above and below the bottom 9 of the reservoir 6 firmly secure said pipe in position. At its upper end, the pipe 10 terminates in an internal flange constituting a seat 12. The upper end of the pipe 10 is further provided with a screen 13.

A float 14 in the form of a disk is operable in the pan 4. Fixed on the float 14 and rising therefrom is a stem 15 which is operable in the pipe 10. A valve 16 on the upper end of the stem 15 is engageable beneath the seat 12. A valve 17 of suitable material on the float 14 is engageable with the lower end of the pipe 10. It will thus be seen that a double seal is provided for positively preventing leakage.

It is thought that the operation of the device will be readily apparent from a consideration of the foregoing. Briefly, as the water in the pan 4 is consumed, the float 14 drops thereby unseating or opening the valves 16 and 17. Water from the reservoir 6 then flows downwardly by gravity through the screened pipe 10 into the pan 4. When the water in the pan 4 has been replenished to the correct level, the float 14 rises and closes the valves 16 and 17. The elevation of the pan 4 from the ground or other supporting surface permits a suitable heating device, such as a lamp, to be conveniently placed therebeneath for preventing the water therein from freezing. The entire device, with water in the reservoir 6, may be moved from place to place with a minimum of effort.

It is believed that the many advantages of a drinking fountain constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

A drinking fountain for fowls comprising a base including a pair of runners and spaced cross members extending between said runners and flush with the upper edges thereof, a pan mounted in the base within the confines of the runners and the cross members and flush with the upper edges thereof, rods mounted on the runners and traversing the pan below the top thereof, a reservoir mounted on said rods, said reservoir being adapted to receive water, and a float valve controlled discharge pipe for conducting water from the reservoir into the pan.

ANDREW S. EASH.